US007008477B2

(12) United States Patent
Chatterji et al.

(10) Patent No.: US 7,008,477 B2
(45) Date of Patent: Mar. 7, 2006

(54) FOAMED CEMENT SLURRIES, ADDITIVES AND METHODS

(75) Inventors: Jiten Chatterji, Duncan, OK (US); Bobby J. King, Duncan, OK (US); Roger S. Cronwell, Walters, OK (US); D. Chad Brenneis, Marlow, OK (US); Dennis W. Gray, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/203,600

(22) Filed: Aug. 12, 2005

(65) Prior Publication Data

US 2006/0027144 A1 Feb. 9, 2006

Related U.S. Application Data

(62) Division of application No. 10/899,504, filed on Jul. 26, 2004, now Pat. No. 6,951,249.

(51) Int. Cl.
*C04B 24/12* (2006.01)
*C04B 24/16* (2006.01)
*C04B 24/24* (2006.01)
*E21B 33/13* (2006.01)
*E21B 33/138* (2006.01)

(52) U.S. Cl. ............... 106/678; 106/677; 106/724; 106/725; 106/802; 106/808; 106/809

(58) Field of Classification Search ............... 106/677, 106/678, 724, 725, 802, 808, 809, 823
See application file for complete search history.

(56) References Cited

U.S. PATENT DOCUMENTS

| | | | |
|---|---|---|---|
| 5,133,409 | A | 7/1992 | Bour et al. |
| 5,147,565 | A | 9/1992 | Bour et al. |
| 5,203,411 | A | 4/1993 | Dawe et al. |
| 5,207,831 | A | 5/1993 | Cowan |
| 5,275,654 | A | 1/1994 | Cowan |
| 5,298,070 | A * | 3/1994 | Cowan ............... 106/724 |
| 5,588,489 | A | 12/1996 | Chatterji et al. |
| 5,696,059 | A | 12/1997 | Onan et al. |
| 5,711,801 | A | 1/1998 | Chatterji et al. |
| 5,897,699 | A | 4/1999 | Chatterji et al. |
| 6,063,738 | A | 5/2000 | Chatterji et al. |
| 6,113,809 | A | 9/2000 | Dino et al. |
| 6,202,751 | B1 | 3/2001 | Chatterji et al. |
| 6,210,476 | B1 | 4/2001 | Chatterji et al. |
| 6,220,354 | B1 | 4/2001 | Chatterji et al. |
| 6,227,294 | B1 | 5/2001 | Chatterji et al. |
| 6,244,343 | B1 | 6/2001 | Brothers et al. |
| 6,273,191 | B1 | 8/2001 | Reddy et al. |
| 6,332,921 | B1 | 12/2001 | Brothers et al. |
| 6,336,505 | B1 | 1/2002 | Reddy |
| 6,364,945 | B1 | 4/2002 | Chatterji et al. |
| 6,367,550 | B1 | 4/2002 | Chatterji et al. |
| 6,390,195 | B1 | 5/2002 | Nguyen et al. |
| 6,419,016 | B1 | 7/2002 | Reddy |
| 6,454,004 | B1 | 9/2002 | Reddy et al. |
| 6,454,008 | B1 | 9/2002 | Chatterji et al. |
| 6,457,524 | B1 | 10/2002 | Roddy |
| 6,478,868 | B1 | 11/2002 | Reddy et al. |
| 6,500,252 | B1 | 12/2002 | Chatterji et al. |
| 6,516,883 | B1 | 2/2003 | Chatterji et al. |
| 6,547,871 | B1 | 4/2003 | Chatterji et al. |
| 6,555,505 | B1 | 4/2003 | King et al. |
| 6,592,660 | B1 | 7/2003 | Nguyen et al. |
| 6,619,399 | B1 | 9/2003 | Chatterji et al. |
| 6,630,021 | B1 | 10/2003 | Reddy et al. |
| 6,662,873 | B1 | 12/2003 | Nguyen et al. |
| 6,668,927 | B1 | 12/2003 | Chatterji et al. |
| 6,689,208 | B1 | 2/2004 | Brothers |
| 6,698,519 | B1 | 3/2004 | Nguyen et al. |
| 6,715,553 | B1 | 4/2004 | Reddy et al. |
| 6,722,433 | B1 | 4/2004 | Brothers et al. |
| 6,722,434 | B1 | 4/2004 | Reddy et al. |
| 6,734,146 | B1 | 5/2004 | Chatterji et al. |
| 6,739,806 | B1 | 5/2004 | Szymanski et al. |
| 6,793,730 | B1 | 9/2004 | Reddy et al. |
| 6,835,243 | B1 | 12/2004 | Brothers et al. |
| 2003/0000428 | A1 | 1/2003 | Chatterji et al. |
| 2004/0016371 | A1 | 1/2004 | Chatterji et al. |
| 2004/0121917 | A1 | 6/2004 | Pakulski |

OTHER PUBLICATIONS

Halliburton brochure entitled "AQF-2 Foamed Agent" dated 1999, no month.
Halliburton brochure entitled "Howco-Suds Surfactant" dated 1999, no month.
Foreign communication from a related counterpart application dated Sep. 22, 2005.

* cited by examiner

*Primary Examiner*—Anthony J. Green
(74) *Attorney, Agent, or Firm*—Craig W. Roddy; Baker Botts L.L.P.

(57) ABSTRACT

The present invention relates to foamed cement slurries, additives and methods. A foamed cement slurry of the invention comprises a hydraulic cement, sufficient water to form a slurry, sufficient gas to form a foam and an environmentally benign foaming and stabilizing additive comprising a mixture of an ammonium salt of an alkyl ether sulfate surfactant, a cocoamidopropyl hydroxysultaine surfactant, a cocoamidopropyl dimethylamine oxide surfactant, sodium chloride and water.

14 Claims, No Drawings

FOAMED CEMENT SLURRIES, ADDITIVES AND METHODS

CROSS-REFERENCE TO RELATED APPLICATIONS

This application is a divisional of prior application Ser. No. 10/899,504 filed Jul. 26, 2004, now U.S. Pat. No. 6,951,249, the entire disclosure of which is incorporated herein by reference.

BACKGROUND OF THE INVENTION

1. Field of the Invention

The present invention relates to foamed cement slurries and additives as well as methods of cementing utilizing the foamed cement slurries and additives.

2. Description of the Prior Art

Foamed hydraulic cement slurries are commonly utilized in forming structures above and below ground. In forming the structures, the foamed hydraulic cement composition is pumped into a form or other location to be cemented and allowed to set therein. Heretofore, foamed cement slurries have included foaming and stabilizing additives which include components such as isopropyl alcohol that interfere with aquatic life. In addition, one or more of the components are often flammable and make the shipment of the foaming and stabilizing additives expensive. Thus, there is a need for foamed hydraulic cement slurries which include environmentally benign foaming and stabilizing additives that do not include flammable components.

In the construction and repair of wells such as oil and gas wells, foamed hydraulic cement slurries are often pumped into locations in the wells to be cemented and allowed to set therein. In primary well cementing, foamed cement slurries are extensively used to cement off-shore deep water wells wherein they encounter temperatures varying between 40° F.–50° F. The foamed cement slurries are pumped into the annular spaces between the walls of the well bores and the exterior surfaces of pipe strings disposed therein. The foamed cement slurries are compressible which prevents the inflow of undesirable fluids into the annular spaces and the foamed cement slurries set therein whereby annular sheaths of hardened cement are formed therein. The annular cement sheaths physically support and position the pipe strings in the well bores and bond the exterior surfaces of the pipe strings to the walls of the well bores whereby the undesirable migration of fluids between zones or formations penetrated by the well bores is prevented.

SUMMARY OF THE INVENTION

The present invention provides foamed cement slurries, additives and methods of cementing which meet the needs described above and overcome the deficiencies of the prior art.

A foamed cement slurry of the present invention comprises a hydraulic cement, sufficient water to form a slurry, sufficient gas to form a foam and a foaming and stabilizing additive comprising a mixture of an ammonium salt of an alkyl ether sulfate surfactant, a cocoamidopropyl hydroxysultaine surfactant, a cocoamidopropyl dimethylamine oxide surfactant, sodium chloride and water.

An additive for foaming and stabilizing a cement slurry of this invention comprises a mixture of an ammonium salt of an alkyl ether sulfate surfactant, a cocoamidopropyl hydroxysultaine surfactant, a cocoamidopropyl dimethylamine oxide surfactant, sodium chloride and water.

A method of cementing of this invention comprises the steps of providing or preparing a foamed cement slurry comprising a hydraulic cement, sufficient water to form a slurry, sufficient gas to form a foam, and a foaming and stabilizing additive comprising a mixture of an ammonium salt of an alkyl ether sulfate surfactant, a cocoamidopropyl hydroxysultaine surfactant, a cocoamidopropyl dimethylamine oxide surfactant, sodium chloride and water; placing the foamed cement slurry in a location to be cemented; and allowing the cement slurry to set.

A method of cementing a subterranean zone penetrated by a well bore of this invention comprises providing or preparing a foamed cement slurry comprising a hydraulic cement, sufficient water to form a slurry, sufficient gas to form a foam and a foaming and stabilizing additive comprising a mixture of an ammonium salt of an alkyl ether sulfate surfactant, a cocoamidopropyl hydroxysultaine surfactant, a cocoamidopropyl dimethylamine oxide surfactant, sodium chloride and water; placing the foamed cement slurry in the subterranean zone to be cemented by way of the well bore; and allowing the foamed cement slurry to set into a hard impermeable mass.

The objects, features and advantages of the present invention will be readily apparent to those skilled in the art upon a reading of the description of preferred embodiments which follows.

DESCRIPTION OF PREFERRED EMBODIMENTS

Embodiments of the present invention provide improved foamed cement slurries, environmentally benign additives for foaming and stabilizing cement slurries, methods of cementing with foamed cement slurries and placing the foamed cement slurries in locations to be cemented and methods of cementing with foamed cement slurries and placing the foamed cement slurries in subterranean zones penetrated by well bores.

A foamed cement slurry of this invention comprises a hydraulic cement; sufficient water to form a slurry; sufficient gas to form a foam; and an environmentally benign foaming and stabilizing additive comprising a mixture of an ammonium salt of an alkyl ether sulfate surfactant, a cocoamidopropyl hydroxysultaine surfactant, a cocoamidopropyl dimethylamine oxide surfactant, sodium chloride and water.

A variety of hydraulic cements can be utilized in accordance with the present invention including, but not limited to, Portland cements, slag cements, silica cements, pozzolana cements and aluminous cements. Of these, Portland cements are generally preferred. Portland cements of the types defined and described in API Specification For Materials and Testing for Well Cements, API Specification 10B, 22$^{nd}$ Edition, Dated Dec. 1, 1997 of the American Petroleum Institute are particularly suitable. Preferred API Portland cements include Classes A, B, C, G and H with API Classes G and H being more preferred and Class H being the most preferred.

The water in the foamed cement slurry can be fresh water, unsaturated salt solutions or saturated salt solutions. Generally, the water in the foamed cement slurry is present in an amount in the range of from about 35% to about 70% by weight of the hydraulic cement therein.

The gas utilized to foam the cement slurry can be air or nitrogen with nitrogen being preferred. Generally, the gas is present in the foamed cement slurry in an amount in the range of from about 10% to about 80% by volume of the slurry.

The ammonium salt of an alkyl ether sulfate surfactant in the environmentally benign foaming and stabilizing additive is a mixture of 30.15% by weight of an ammonium salt of a $C_{6-10}$ alkyl ether sulfate containing 1.8 moles of ethylene oxide, 10.05% by weight of an ammonium salt of a $C_4$ alkyl ether sulfate containing 2 moles of ethylene oxide, and 0.40% by weight of ammonium sulfate. The ammonium salt of an alkyl ether sulfate surfactant is present in the foaming and stabilizing additive in an amount of about 40.60% by weight of the additive.

The cocoamidopropyl hydroxysultaine surfactant in the environmentally benign foaming and stabilizing additive is present in the additive in an amount of about 8.54% by weight of the additive. The cocoamidopropyl dimethylamine oxide surfactant in the foaming and stabilizing additive is present therein in an amount of about 1.43% by weight of the additive. The sodium chloride in the foaming and stabilizing additive is present therein in an amount of about 6.02% by weight of the additive and the water in the foaming and stabilizing additive is present therein in an amount of about 43.41% by weight of the additive.

The environmentally benign foaming and stabilizing additive of this invention is present in the foamed cement slurry in an amount in the range of from about 0.8% to about 10% by volume of the water in the foamed cement slurry.

A foamed cement slurry of this invention comprises: a hydraulic cement; sufficient water to form a slurry; sufficient gas to form a foam; and an environmentally benign foaming and stabilizing additive comprising a mixture of an ammonium salt of an alkyl ether sulfate surfactant, a cocoamidopropyl hydroxysultaine surfactant, a cocoamidopropyl dimethylamine oxide surfactant, sodium chloride and water. The amounts of the components in the foamed cement slurry are the same as those set forth above and the amounts of the components of the environmentally benign foaming and stabilizing additive are the same as those set forth above.

An environmentally benign additive of this invention for foaming and stabilizing a cement slurry comprises a mixture of an ammonium salt of an alkyl ether sulfate surfactant, a cocoamidopropyl hydroxysultaine surfactant, a cocoamidopropyl dimethylamine oxide surfactant, sodium chloride and water. The amounts of the components in the additive are the same as those set forth above.

A method of cementing of the present invention comprises the steps of: preparing a foamed cement slurry comprising a hydraulic cement, sufficient water to form a slurry, sufficient gas to form a foam, and an environmentally benign foaming and stabilizing additive comprising a mixture of an ammonium salt of an alkyl ether sulfate surfactant, a cocoamidopropyl hydroxysultaine surfactant, a cocoamidopropyl dimethylamine oxide surfactant, sodium chloride and water; placing the foamed cement slurry in a location to be cemented; and allowing the cement slurry to set. The amounts of the components in the foamed cement slurry are the same as those set forth above and the amounts of the components of the environmentally benign foaming and stabilizing additive are the same as those set forth above.

Finally, a method of cementing a subterranean zone penetrated by a well bore of this invention comprises the steps of: preparing a foamed cement slurry comprising a hydraulic cement, sufficient water to form a slurry, sufficient gas to form a foam, and an environmentally benign foaming and stabilizing additive comprising a mixture of an ammonium salt of an alkyl ether sulfate surfactant, a cocoamidopropyl hydroxysultaine surfactant, a cocoamidopropyl dimethylamine oxide surfactant, sodium chloride and water; placing the foamed cement slurry in the subterranean zone by way of the well bore; and allowing the foamed cement slurry to set into a hard impermeable mass. The amounts of the components in the foamed cement slurry are the same as those set forth above and the amounts of the components in the environmentally benign foaming and stabilizing additive are the same as set forth above.

In order to further illustrate the cement slurries, the environmentally benign additives for foaming and stabilizing a cement slurry, the methods of cementing in a location to be cemented, and the methods of cementing a subterranean zone penetrated by a well bore, the following examples are given.

EXAMPLE 1

An environmentally benign additive for foaming and stabilizing a cement slurry of this invention was prepared in the laboratory consisting of an ammonium salt of an alkyl ether sulfate surfactant (90% active) present in the mixture in an amount of 40.60% by weight of the mixture, a cocoamidopropyl hydroxysultaine surfactant (30% active) present in an amount of 8.54% by weight of the mixture, a cocoamidopropyl dimethylamine oxide surfactant (30% active) present in an amount of 1.43% by weight of the mixture, sodium chloride present in an amount of 6.02% by weight of the mixture, and water present in the mixture in an amount of 43.41% by weight of the mixture.

The ammonium salt of an alkyl ether sulfate surfactant consisted of a mixture of an ammonium salt of a $C_{6-10}$ alkyl ether sulfate surfactant containing 1.8 moles of ethylene oxide present in an amount of 30.15% by weight, an ammonium salt of a $C_4$ alkyl ether sulfate surfactant containing 2 moles of ethylene oxide present in an amount of 10.05% by weight, and 0.40% by weight of ammonium sulfate.

The foaming properties, foam stability and uniformity of the foamed cement after setting was determined for a foamed cement slurry comprising Portland Class H cement and water prepared in a multi-blade foam generator having a density of 16.49 pounds per gallon. To a portion of the foamed cement slurry, the environmentally benign foaming and stabilizing additive of this invention was added in an amount of 2% by weight. To a second portion of the foamed cement slurry, a prior art foaming and stabilizing additive was added in an amount of 2% by weight. The prior art foaming and stabilizing additive comprises a mixture of ethoxylated alcohol ether sulfate, an alkyl or alkene amidopropyl betaine and an alkyl or alkene amidopropyl dimethylamine oxide. This surfactant is described and claimed in U.S. Pat. No. 6,063,738 issued on May 16, 2000 to Chatterji et al. entitled FOAMED WELL CEMENT SLURRIES, ADDITIVES AND METHODS which is incorporated herein by reference thereto.

The foaming and stabilizing additives were added to the cement compositions in amounts of 2% by volume of the water therein. The calculated density, 15 second density and 72 hours compressive strength at 140° F. were determined for each of the cement compositions. Also, the densities of the compositions after setting were determined at the top, middle and bottom of the set compositions. The results of these tests are set forth in TABLE I below.

TABLE I

Portland Class H Cement and Water (Base Density - 16.49 lb/gal)

| Foaming and Stabilizing Additive and % By Volume of Water | Calculated Density (lb/gal) | 15 Second Density (lb/gal) | 72 Hour Compressive Strength (psi) | Density After Set (lb/gal) | | |
|---|---|---|---|---|---|---|
| | | | | Top | Middle | Bottom |
| 2% Prior Art Additive | 11 | 10.22 | 1070 | 10.58 | 9.95 | 9.8 |
| 2% Present Invention Additive | 11 | 10.14 | 865 | 9.26 | 9.44 | 9.41 |

From Table I, it can be seen that the environmentally benign foaming and stabilizing additive of the present invention functions substantially as well as the prior art foaming and stabilizing additive which is not environmentally benign.

EXAMPLE 2

The tests described above and set forth in Table I were repeated using a cement composition containing salt, i.e., a cement composition comprising Joppa Class H cement, 15% amorphous silica by weight of cement, 37% sodium chloride by weight of cement and water having a density of 15.62 pounds per gallon. The results of the tests are given in Table II below.

TABLE II

Joppa Class H Cement, 15% Amorphous Silica, 37% Sodium Chloride and Water (Base Density - 15.62 lb/gal)

| Foaming and Stabilizing Additive and % By Volume of Water | Calculated Density (lb/gal) | 15 Second Density (lb/gal) | 72 Hour Compressive Strength (psi) | Density After Set (lb/gal) | | |
|---|---|---|---|---|---|---|
| | | | | Top | Middle | Bottom |
| 2% Prior Art Additive | 11.2 | 11.76 | 1038 | 11.02 | 11.11 | 11.20 |
| 2% Present Invention Additive | 11.2 | 11.38 | 953 | 10.77 | 10.92 | 10.96 |

From Table II, it can be seen that the environmentally benign foaming and stabilizing additive of this invention functioned well in the presence of salt.

EXAMPLE 3

The tests described in Example 1 above were repeated utilizing a cement composition formed with sea water, i.e., a cement composition comprising Joppa Class H cement and sea water having a base density of 16.62 pounds per gallon. The results of the tests are set forth in Table III below.

TABLE III

Joppa Class H and Sea Water (Base Density - 16.62 lb/gal)

| Foaming and Stabilizing Additive and % By Volume of Water | Calculated Density (lb/gal) | 15 Second Density (lb/gal) | 72 Hour Compressive Strength (psi) | Density After Set (lb/gal) | | |
|---|---|---|---|---|---|---|
| | | | | Top | Middle | Bottom |
| 2% Prior Art Additive | 11 | 10.20 | 1036 | 9.76 | 9.78 | 9.78 |
| 2% Present Invention Additive | 11 | 10.19 | 1085 | 9.65 | 9.67 | 10.11 |

From Table III, it can be seen that the environmentally benign foaming and stabilizing additive of the present invention functioned as well or better in sea water than the prior art foaming and stabilizing additive.

EXAMPLE 4

The tests described in Example 1 above were repeated utilizing a cement composition containing slag, i.e., a cement composition containing slag, sodium carbonate in an amount of 8% by weight of the slag and water. The results of the tests are set forth in Table IV below.

TABLE IV

Slag, 8% Sodium Carbonate and Water (Base Density - 15.0 lb/gal)

| Foaming and Stabilizing Additive and % By Volume of Water | Calculated Density (lb/gal) | 15 Second Density (lb/gal) | 72 Hour Compressive Strength (psi) | Density After Set (lb/gal) | | |
|---|---|---|---|---|---|---|
| | | | | Top | Middle | Bottom |
| 2% Prior Art Additive | 11 | 12.02 | 2070 | 12.15 | 12.1 | 12.14 |
| 2% Present Invention Additive | 11 | 11.30 | 1467 | 11.41 | 11.48 | 11.50 |

From Table IV, it can be seen that the environmentally benign foaming and stabilizing additive of the present invention functioned well.

EXAMPLE 5

The tests described in Example 1 were repeated utilizing a cement composition comprising Class F fly ash, hydrated lime in an amount of 15% by weight of the fly ash, calcium chloride present in an amount of 4% by weight of the fly ash and water. The results of the tests are set forth in Table V below.

TABLE V

Class F Fly Ash, 15% Hydrated Lime, 4% Calcium Chloride and Water (Base Density - 14.08 lb/gal)

| Foaming and Stabilizing Additive and % By Volume of Water | Calculated Density (lb/gal) | 15 Second Density (lb/gal) | 72 Hour Compressive Strength (psi) | Density After Set (lb/gal) | | |
|---|---|---|---|---|---|---|
| | | | | Top | Middle | Bottom |
| 2% Prior Art Additive | 10 | 9.57 | 692 | 9.28 | 9.19 | 9.18 |
| 2% Present Invention Additive | 10 | 9.53 | 693 | 9.18 | 9.12 | 9.11 |

From Table V, it can again be seen that the environmentally benign foaming and stabilizing additive functioned as well as the prior art additive in a fly ash cement composition.

EXAMPLE 6

The tests set forth in Example 1 were repeated utilizing a cement composition comprising micro matrix cement and water. The results of the tests are set forth in Table VI below.

TABLE VI

Micro Matrix Cement and Water (Base Density - 12.5 lb/gal)

| Foaming and Stabilizing Additive and % By Volume of Water | Calculated Density (lb/gal) | 15 Second Density (lb/gal) | 72 Hour Compressive Strength (psi) | Density After Set (lb/gal) | | |
|---|---|---|---|---|---|---|
| | | | | Top | Middle | Bottom |
| 2% Prior Art Additive | 10 | 9.46 | 974 | 9.46 | 9.53 | 9.5 |
| 2% Present Invention Additive | 10 | 9.48 | 1032 | 9.55 | 9.53 | 9.57 |

From Table VI, it can again be seen that the environmentally benign foaming and stabilizing additive of this invention functioned as well or better than the prior art foaming and stabilizing additive.

EXAMPLE 7

The tests set forth in Example 1 were repeated utilizing a cement composition comprising calcium aluminate, ASTM Class F fly ash and water as described in U.S. Pat. No. 6,332,921 issued on Dec. 25, 2001 to Brothers et al., which is incorporated herein by reference thereto. The results of the tests are set forth in Table VII below.

EXAMPLE 8

In order to determine the ability of the environmentally benign foaming and stabilizing additive of the present invention to foam at low temperatures, the following experiment was performed. A Joppa Class H cement slurry containing 2% of the environmentally benign foaming and stabilizing additive in an amount of 2% by weight of the water in the cement slurry having a density of 16.49 pounds per gallon was foamed at ambient temperature and pressure to a density of 10.24 pounds per gallon (the desired density was 11.0 pounds per gallon). The foamed slurry was stirred in an atmospheric consistometer for one hour at 50° F. At the end of the stirring, the foamed slurry had a density of 9.96

TABLE VII

Calcium Aluminate, ASTM Class F Fly Ash and Water (Base Density - 15.02 lb/gal)

| Foaming and Stabilizing Additive and % By Volume of Water | Calculated Density (lb/gal) | 15 Second Density (lb/gal) | 72 Hour Compressive Strength (psi) | Density After Set (lb/gal) | | |
|---|---|---|---|---|---|---|
| | | | | Top | Middle | Bottom |
| 2% Prior Art Additive | 11 | 10.43 | 468 | 10.92 | 10.94 | 10.87 |
| 2% Present Invention Additive | 11 | 10.45 | 492 | 10.57 | 10.71 | 10.69 |

From Table VII it can be seen that the environmentally benign foaming and stabilizing additive of this invention functioned as well as or better than the prior art foaming and stabilizing additive.

pounds per gallon. The slurry was then cured at 55° F. for 72 hours. The experiment was repeated utilizing the prior art foaming and stabilizing additive. The results of the tests are set forth in Table VIII below.

TABLE VIII

Joppa Class H Cement and Water (Base Density - 16.49 lb/gal)

| Foaming and Stabilizing Additive and % By Volume of Water | Calculated Density (lb/gal) | 15 Second Density (lb/gal) | Density @ 1 Hour (lb/gal) | Density After Set (lb/gal) | | |
|---|---|---|---|---|---|---|
| | | | | Top | Middle | Bottom |
| 2% Prior Art Additive | 11 | 10.21 | 14.33 | 15.42 | 16.49 | 17.47 |
| 2% Present Invention Additive | 11 | 10.18 | 10.07 | 9.13 | 9.44 | 9.80 |

From Table VIII, it can be seen that the environmentally benign foaming and stabilizing additive cured sufficiently at 55° F.

EXAMPLE 9

Foam transfer data using a MACS analyzer was determined for a 16 pound per gallon slurry consisting of Joppa Class H cement, crystalline silica present in an amount of 35% by weight of the cement, amorphous silica present in an amount of 5% by weight of cement, a non-dispersing set retarder present in an amount of 0.6% by weight of the cement and the environmentally benign foaming and stabilizing additive of the present invention present in an amount of 2% by volume of water in the cement slurry. The non-dispersing retarder utilized is described in U.S. Pat. No. 6,227,294 issued to Chatterji et al. on May 8, 2001 which is incorporated herein by reference thereto.

The cement composition described above was foamed at 200° F. and a pressure of 1000 psi in the MACS analyzer, i.e., an instrument known as a multiple analysis cement slurry (MACS) analyzer. The foamed cement slurry in the MACS analyzer was transferred at 200° F. through a manifold system to curing cells that were preheated and charged with nitrogen at the same pressure to which the slurry is subjected in the mixing chamber of the analyzer. The foamed slurry had density of 10.91 pounds per gallon (desired density was 11.5 pounds per gallon). The foamed cement composition was cured at a temperature of 250° F. for a period of 72 hours. Thereafter the densities of the top, middle and bottom of the cured sample was measured.

The results of these tests are set forth in Table IX below.

TABLE IX

Joppa Class H Cement, Crystalline Silica, Amorphous Silica, Set Retarder and Water (Base Density-16.0 lb/gal)

| Foaming and Stabilizing Additive and % By Volume | Calculated Density | Transfer Cell Density | Density After Set (lb/gal) | | |
|---|---|---|---|---|---|
| of Water | (lb/gal) | (lb/gal) | Top | Middle | Bottom |
| 2% Present Invention Additive | 11.5 | 10.34 | 10.49 | 10.40 | 10.24 |

From Table IX, it can be seen that the sample cured under high temperature and pressure has a minimum variation of density from top to bottom.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

The invention claimed is:

1. A foamed cement slurry comprising:
a hydraulic cement;
sufficient water to form a slurry;
sufficient gas to form a foam; and
a foaming and stabilizing additive comprising a mixture of an ammonium salt of an alkyl ether sulfate surfactant, cocoamidopropyl hydroxysultaine surfactant, cocoamidopropyl dimethylamine oxide surfactant, sodium chloride and water.

2. The foamed cement slurry of claim 1 wherein the hydraulic cement comprises Portland cements, slag cements, silica cements, pozzolana cements or aluminous cements.

3. The foamed cement slurry of claim 1 wherein the water comprises fresh water, unsaturated salt solutions and saturated salt solutions.

4. The foamed cement slurry of claim 1 wherein the water in the foamed cement slurry is present in an amount in the range of from about 35% to about 70% by weight of hydraulic cement therein.

5. The foamed cement slurry of claim 1 wherein the gas comprises air or nitrogen.

6. The foamed cement slurry of claim 1 wherein the gas in the foamed cement slurry is present in the range of from about 10% to about 80% by volume of the cement slurry.

7. The foamed cement slurry of claim 1 wherein the ammonium salt of an alkyl ether sulfate surfactant in the foaming and stabilizing additive is a mixture of 30.15% by weight of an ammonium salt of a $C_{6-10}$ alkyl ether sulfate surfactant containing 1.8 moles of ethylene oxide, 10.05% by weight of an ammonium salt of a $C_4$ alkyl ether sulfate surfactant containing 2 moles of ethylene oxide, and 0.40% by weight of ammonium sulfate.

8. The foamed cement slurry of claim 1 wherein the cocoamidopropyl hydroxysultaine surfactant in the foaming and stabilizing additive is present in an amount of about 8.54% by weight of the additive.

9. The foamed cement slurry of claim 1 wherein the cocoamidopropyl dimethylamine oxide surfactant in the foaming and stabilizing additive is present in an amount of about 1.43% by weight of the additive.

10. The foamed cement slurry of claim 1 wherein the sodium chloride in the foaming and stabilizing additive is present in an amount of about 6.02% by weight of the additive.

11. The foamed cement slurry of claim 1 wherein the water in the foaming and stabilizing additive is present in an amount of about 43.41% by weight of the additive.

12. The foamed cement slurry of claim 1 wherein the foaming and stabilizing additive in the foamed cement slurry is present in an amount in the range of from about 0.8% to about 10% by volume of the water in the foamed cement slurry.

13. A foamed cement slurry comprising:
a hydraulic cement;
water present in an amount in the range of from about 35% to about 70% by weight of hydraulic cement therein;
gas present in the range of from about 10% to about 80% by volume of the cement slurry;
a foaming and stabilizing additive comprising a mixture of an ammonium salt of an alkyl ether sulfate surfactant, cocoamidopropyl hydroxysultaine surfactant, cocoamidopropyl dimethylamine oxide surfactant, sodium chloride and water.

14. The foamed cement slurry of claim 13 wherein the foaming and stabilizing additive in the foamed cement slurry is present in an amount in the range of from about 0.8% to about 10% by volume of the water in the foamed cement slurry.

* * * * *